June 3, 1969  J. O. BENSON ET AL  3,447,931
PROCESS FOR PREPARING A PUFFED, CONCAVE SHAPED CEREAL PRODUCT
Filed Jan. 29, 1965
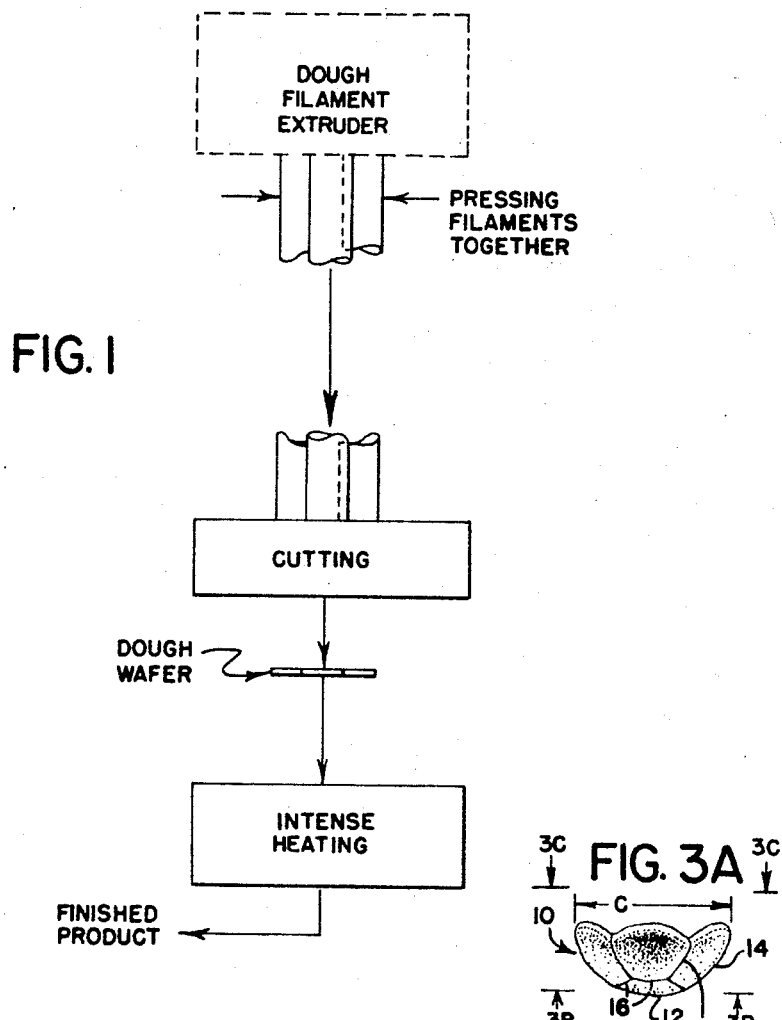
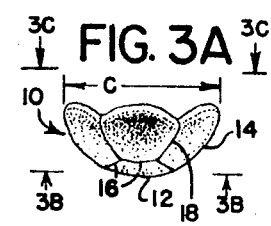
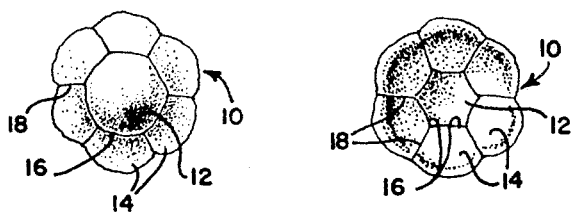
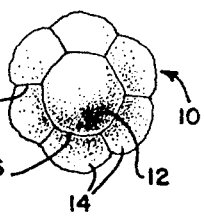
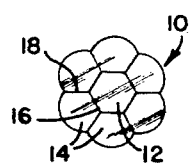
INVENTORS
JOHN O. BENSON
ROLF MOEN
BY
Robert B. Hughes
ATTORNEY United States Patent Office 3,447,931
Patented June 3, 1969

3,447,931
PROCESS FOR PREPARING A PUFFED, CONCAVE SHAPED CEREAL PRODUCT
John O. Benson, Mayer, and Rolf Moen, Hopkins, Minn., assignors to General Mills, Inc., a corporation of Delaware
Filed Jan. 29, 1965, Ser. No. 429,069
Int. Cl. A23l 1/18
U.S. Cl. 99—81                    5 Claims

ABSTRACT OF THE DISCLOSURE

A column of cooked dough having a center filament and a plurality of outer filaments which surround the center filament, is cut into wafers having a predetermined diameter and a prescribed thickness and then subjected to intense heat to puff or expand the same into pieces having a concave shape.

---

The present invention relates to a new and improved food product and to a method for making the same, which food product can properly be categorized as a "snack."

The food products which are sold in the general category of snack items are many and varied, including such things as chips (e.g., potato chips, corn chips), puffs (e.g., corn puffs), etc., and they account for a large dollar volume in the food industry. Generally, these are eaten apart from a regular meal, for example, as party snacks or as appetizers, sometimes with spreads or fillings, or the like. Often different snack items are served at the same time, perhaps in different snack dishes or in an hors do'euvre tray presenting a variety of these and other food items for the choice of the guests or customers.

People generally regard these snacks rather discriminatingly and do not expect to gain from them a great deal of their day's nourishment. Rather a person will sample the various snacks in a leisurely manner, centering his choice on those snacks which have some sort of special appeal.

Thus it is quite understandable that while manufacturers of snacks have done considerable work in developing refinements in their established products and in maintaining good quality control in the manufacture thereof, a good deal of creative effort has been directed toward making snack products which are distinctive in some regard, so that such a product might have some particularly appealing quality not existing in other snack products. The eye-appeal or appearance (in addition to such things as flavor, etc.) is, of course, of considerable importance in snack products, and a good deal of attention has been given to improving such things as the color of the product, its texture (not only as it affects taste, but also as it affects appearance), and also to the general shape of the snack pieces.

However, attempting to attain some measure of individuality in the shape, design, or configuration of the pieces is not without problems. Generally in making snacks, the food material is subjected to an intense heating (e.g., by deep fat frying or heating in an oven or other device), which not only develops certain desired flavor characteristics in the finished product, but also causes an internal expansion or puffing of the same in such a manner that the shape of each of the snack pieces changes somewhat unpredictably. Thus chip snacks (e.g., potato chips) will bend into different shapes, and puff type snacks will expand and also bend and curl into various configurations. So although in a general way some control is possible with respect to the configuration of such snack products (e.g., making it more flat or rounded, or long or short), it is quite difficult to obtain any refinements of shape or design such as those present in some other food products, such as some cracker or cookie products.

There is the further problem in shaping such snack products that there are limitations in the manner in which the food material being processed can be formed without changing undesirably the texture, cell structure or other qualities of the end product. Also the shape of the pieces before the intense heating (e.g., frying, toasting, etc.) must be such that the product will puff or cook somewhat uniformly so as to develop the desired flavor and texture throughout the product. And then, of course, any step in the overall snack making process must lend itself to being performed in a commercial operation in a practical manner, with regard to such things as economy and reliabiltiy of operation, quality control, etc.

In view of the foregoing it is a principal object of the present invention to provide a puffed snack product and a process for making the same, wherein the snack product is made from dough and is subjected to an intense heating to puff the same and yet has a distinctive shape, design or configuration that is quite desirable for a snack product, in addition to having the other qualities of flavor, texture, etc., desired for a high quality snack product. In this regard it is noted that this product has a shape or configuration which not only contributes very greatly to the eye appeal of the product, but which also has utility in that it permits each of the snack pieces to be filled conveniently with a spread, snack dip or the like in such a manner that an especially desirable snack serving is possible.

These and other objects and features of the invention will be more readily understood and appreciated from the following detailed description of the preferred embodiments thereof selected for purposes of illustration and shown in the accompanying drawings, in which:

FIGURE 1 is a diagrammatic sketch illustrating the overall process according to which the present invention is practiced;

FIG. 2A is a side elevational view of a wafer made according to the present invention, prior to the final intense heating of the same;

FIG. 2B is a view taken from the location indicated at 2B—2B of FIG. 2A;

FIG. 3A is a side elevational view of such a wafer after the final intense heating;

FIG. 3B is a view taken from the location indicated at 3B—3B of FIG. 3A; and

FIG. 3C is a view taken from the location indicated at 3C—3C of FIG. 3A.

It should be pointed out that the present invention is an outgrowth of a basic invention in the food art which is disclosed in United States Patent No. 2,858,219. In this patent is described a process whereby a dough material is extruded into a bundle of filaments, each of which are coated with some material such as a coloring material. These filaments are then pressed laterally together to cause the filaments to adhere to one another while maintaining their separate identity. Subsequent to this the resulting filament rope is cut transversely into a plurality of wafers which are then subjected to heat to form the finished product.

The general aim of the process of this patent is best expressed in the words of the patent as follows: "The principal object of the instant invention is to produce a cereal flake having a distinctly attractive appearance." Within the framework in which specific disclosures in the patent were cast (the patent specification gave particular attention to make a ready-to-eat breakfast cereal), the patent goes on to point out, "in this regard it is an aim of the invention to provide a flake having a multiplicity of bulges or small mounds distributed so that the flake has a honeycomb-like surface and has a contrasting color surrounding each of these swellings in a honeycomb pattern." And after this, the patent specification adds, "further, it is within the purview of the invention to add various flavors in admixture with the color which surrounds the swellings on the flakes."

In recent years, many different avenues were explored to find the most desirable ways to employ the inventive concepts disclosed in this patent. Different formulations and combinations of the dough ingredients and of the contrasting medium which coats the dough filaments were devised to achieve various results. Also there were several different approaches regarding the actual mechanical means to best accomplish the formation of the dough rope. Other areas of exploration were to vary the processing conditions (i.e., pressure, temperature, extrusion rates, etc.) and the manner of cooking, and to arrange the dough filaments and the contrasting medium (which often was a color contrasting medium) in different patterns.

At one stage of development it was attempted to apply the concepts of this patent to a puff-type snack product. After various experiments, it was discovered that under certain circumstances the pieces of the end product did not bend so unpredictably. Rather, it was found that it was possible to form a finished product in which the individual pieces with a relatively high degree of consistency assumed a quite concave-convex or cup-like shape which had a definite esthetic appeal in that each piece had a distinctive cupped flower-like appearance. That is to say, the pieces were such as to be formed with a center portion corresponding to the central disc portion of a flower bloom, and a number of parts which curved upwardly therefrom to resemble the petals of the flower. Also with regard to the intended use as a snack; the shape of the product was such as to have definite utility in that the pieces readily lent themselves to being filled quite conveniently and attractively with a snack dip or spread.

Also it was found that this cupped flower configuration of the snack pieces had an esthetic appeal not only as to the design of the individual snack pieces, but also as to the possibilities it offered in arranging an attractive snack tray. For example, the various pieces could be placed somewhat in the manner of a decorative floral arrangement, and different types of colors of contrasting snack dip could be placed in different snack pieces to correspond to the central disc portions of the blooms so as to give the illusion of a group of various flower blooms. In the area of snacks where the consumer public regards the products so discriminatingly, it can be appreciated that this development was regarded as one which adds to the snack product an uncommon quality of some appeal.

The many factors involved in the making of this type of snack product were further investigated, and it was discovered that a particular few are critical in obtaining this configuration, while some others which would appear to be of some significance have little if any effect. One critical factor is that the pieces be formed with a center portion joined to a plurality of peripheral portions which completely enclose or encircle the center portion. Also the relationship between the thickness and diameter of these pieces was found to be critical; and it may be noted as a matter of interest that for some reason or reasons not understood, the face along which the pieces were cut had an effect as to the direction in which the face of the pieces would become concave. It was thought that the direction of extrusion of the dough rope would have a marked effect, this being based on the theory that extruding the rope would set up sheer stresses within the dough which would tend to relieve themselves by cupping the pieces. (It is known that in extruding a material such as dough, the center portion of the extruded material travels at a faster rate than the peripheral portions which are proximate the edge portions of the extruding orifice, which would tend to create sheer stresses in a longitudinal direction in the rope of dough.) However, this was found to be not especially significant. Also it was found that certain factors in the tempering of the dough which were thought to be quite critical had little if any effect.

Another factor which was investigated with some thoroughness was the manner in which the final intense heating of the dough pieces affected the final shape. This was thought certainly to be quite critical since it was during the short span of time of this intense heating that the cupping of the pieces took place. It was believed to be necessary to subject the pieces to a sort of tumbling action to initiate the pieces into this bending or somehow predispose the pieces so that the internal stresses created in the pieces by the final intense heating could complete the cupping of the pieces. However, this was found not to be the case. In fact, the experimental results gave reason to believe that agitation or tumbling of the pieces during the intesne final heating may even disturb the effects produced by the forces created within the pieces during the final intense heating.

Thus, after sorting out the experimental results, the nature of the discovery which is the present invention was finally clarified. It was determined that a distinctive cup shaped, flower-like snack product can be obtained if the following conditions are met:

(a) A plurality of filaments of cooked dough are extruded and pressed together generally in the manner taught by United States Patent No. 2,858,219 to form a column or rope, which is cut into wafers;

(b) The cross sectional configuration of the column or rope must be such that there is a center filament portion and a surrounding filament portion made up of a plurality of filaments which completely encircle the center filament portion;

(c) The wafers must be such that the thickness to diameter ratio thereof is (within the dimensions practical for such a product) between about 1 to 30 and 4 to 30; and (d) These wafers are subjected to an intense heat to puff and expand the same.

These findings gave rise to the following explanation to account for the rather consistent cupping action of the snack pieces. First it can be assumed with some degree of reasonableness that the manner of shaping the pieces by coalescing filaments of dough into a rope and cutting this rope transversely results in wafers that are weakened along such coalescing surfaces, or at least are weakened with respect to torque loads exerted about axes parallel to the plane of the pieces. Next it can be surmised that during the puffing by intense heating (whether this be done in a deep fat fryer, or an oven, or a puffing apparatus such as a "salt puffer," which will be depicted somewhat briefly hereinafter, or some other means), the rate of heat transfer to the various parts of each piece is not uniform. Probably the peripheral portion of each piece is heated more intensely and tends to become set in its final puffed configuration more quickly than the center portion of the pieces. Initially, the center portion would tend to pull in against the peripheral portion to restrict the outward expansion thereof, with the result that this peripheral portion becomes set in a ring of smaller diameter than would be the case if this inward or centripetal force were absent. The full expansion of the center portion takes place subsequent to that of the peripheral portion, with the result that, because the peripheral portion has become set with a somewhat smaller diameter than would otherwise be the case, the peripheral portion tends to constrict the later expansion of the center portion of the piece. The result is that the stresses that are thus created by the final expansion of the center portion cause bending at such coalescing surfaces to cause the center portion to move out of the plane defined by the snack piece.

Then the question arises as to why the entire center portion of the piece with a relatively high consistency moves out in the same direction to create a cup shape rather than in an irregular pattern of bending commonly seen in other snack products. One explanation is as follows. It could be assumed that usually one surface of each snack piece receives heat at a faster rate than the other surface and thus expands at a faster rate to cause the entire wafer to become moderately concave to predispose the piece to bending or cupping in one direction. Then further expansion of the center portion of each piece causes further concavity or cupping in that same direction. Another explanation of some merit is that severing the wafer from the rope sets up certain stresses which relieve themselves by cupping so that the last severed surface becomes concave. Experimental results give some credibility to both explanations.

However, regardless of the validity of all or any of these foregoing explanations, it has been found that with certain conditions which conditions were mentioned briefly above and which will be disclosed more fully hereinafter), this distinctive cup-shaped snack product having a concave flower-like appearance can be produced with a relatively high consistency.

As indicated previously, the present invention is an outgrowth of the process disclosed in U. S. Patent No. 2,858,219, issued to John O. Bensen. This issued patent discloses with some particularity the various aspects of this basic process, including mechanical means by which it can be practiced. So while it is felt that no worthwhile purpose would be served by engaging in the redundancy of any detailed description of this basic process, it is believed that a clear disclosure of the present invention can be more conveniently accomplished if the basic process of Patent No. 2,858,219 is disclosed herein somewhat generlaly, this being done hereinafter in conjunction with FIG. 1 of the accompanying drawings, in which this process is summarily diagrammed.

The precise formulation of the dough ingredients will depend, of course, upon the particular character desired for the end product. As indicated in Patent No. 2,858,219 the invention of the patent "is applicable to a variety of cooked cereal doughs and such doughs embrace derivations from wheat, corn, oats, barley, rye and the like." Of course, other ingredients can and desirably are used in addition to these to give a particular flavor, color, or some other desired quality to the end product. Some of these ingredients are disclosed in the following examples. Also, as indicated in the aforementioned patent, any suitable method of cooking can be used, such as using one of the many types of continuous cookers or a device which works the dough ingredients mechanically to cook the same, etc. The particular choice of the method of cooking will depend upon such things as the character desired for the end product or practicality in a commercial operation, etc.

As indicated in FIG. 1, the cooked dough is extruded into a plurality of filaments which are pressed together to form a rope or column of dough. The aforementioned patent (i.e., U.S. 2,858,219) discusses this in some detail, so no further discussion of the same is included herein. However, it is important to note that the arrangement of the dough filaments be such that there is a center filament portion (which may be a single filament or a plurality of filaments) and an outer filament portion comprised of a plurality of dough filaments and completely encircling the center portion. This configuration is not in and of itself new, and an embodiment of the same is disclosed in FIG. 9 of U.S. Patent No. 2,858,219 in the form of a finished breakfast cereal flake.

In the preferred embodiment of the present invention shown in the accompanying drawings, there is a single center filament which is surrounded by six peripheral or outer filaments, each of which inner and outer filaments is of about the same diameter, so that when the dough rope is cut transversely, each wafer formed by such cut correspondingly has a center portion which is completely surrounded by six peripheral portions. This is illustrated in FIGS. 2A and 2B, wherein is shown a wafer 10 before the final intense heating, the center portion being designated 12 and the six outer portions each being designated 14. The center portion assumes the shape of a regular hexagon, each side of which is designated 16, and the sides or surfaces along which the outer portions 14 join one to another each extend radially outward from an apex point of said hexagon in a straight line, as at 18.

After the formation of the rope of dough, this rope of dough is prepared for cutting most conveniently by exposing it to the surrounding atmosphere for an hour or two. This will cool the rope and permit it to set up, with some degree of drying taking place, and this will tend to equalize the physical characteristics throughout the dough, so as to produce a more desirable product for slicing. The rope is then sliced into wafers 10 and the wafers 10 are brought to a moisture of preferably 8–10%. This can be done by spreading out the wafers and permitting them to stand at room temperature or more quickly by passing moderately hot air (e.g., 150° F.) through the wafers. It is at this 8–10% moisture content that the wafers can best be puffed.

The wafers 10 (which are, as illustrated in FIGS. 2A and 2B, flat) are then subjected to an intense heating. This intense heating is commonly performed in making cereal derived products, such as various ready-to-eat breakfast cereals and snacks, and it can be performed in various ways, as by an air oven, a radiant oven, a salt puffing apparatus, or deep fat frying (the latter being used more often in snack foods). The intense heating not only develops certain desirable flavor components in the product, but also serves to puff or expand the same so as to give the product a certain crispness and yet a desired lightness in texture and cell structure. The precise manner by which the intense heating is accomplished will depend upon various things, such as the chcaracter of the end product desired, the practicality of using the same in a particular commercial operation, etc. It has been found that the phenomenon of the present invention (i.e., the cupping of the snack pieces into the final flower-like configuration) takes place with a relatively high consistency with any of the common methods of the final intense heating (e.g., deep fat frying, using an air oven or radiant oven, and using a salt puffer), with some methods giving especially good results.

The processing conditions of this intense heating (commonly referred to as "puffing," or "toasting and puffing," or "deep-fat frying") which produce a light puffed texture without burning the product are generally known in the art, and the processing conditions which produce a desirable, puffed end product are the same which are found to be practical in the present invention. Thus, if deep-fat frying is used for the final intense heating, the oil bath temperature will for best results be at about 390° or 400° F., and the frying time will be about 10–25 seconds. If an air oven is used, the temperature of the air would ordinarily be between about 350 to 550° F., the air velocity may vary between about 100 to 400 feet per minute, and the residence time in the oven would be between about 15 to 60 seconds. When a salt puffer is used, the wafers 10 are placed in the presence of a cooking medium of discrete salt particles which are tumbled or fluidized in some manner. One method of doing this is to place the wafers 10 in a rotating drum with the salt particles, in which case the temperature of the salt particles would be in the range of 300 to 450° F., preferably about 400° F., and the residence time of the pieces in the drum would be in the range of 8 to 30 seconds, preferably about 20 seconds. It is to be understood that these limits or preferred processing conditions of the intense heating are not absolute critical limits, but are those within which satisfactory results can generally be obtained, and will vary depending upon such things as wall thickness of the pieces being puffed, etc. Understandably, this cupping phenomenon could occur within processing conditions which are too extreme to produce a good quality puffed product, but experimental excursions into this area are of no practical value.

Regardless of the precise method of intense heating used, the wafers 10 are, by virtue of this final intense heating, formed with a relatively high consistency into a cup-shaped configuration, as shown in FIGS. 3A, 3B and 3C. This cupping phenomenon occurs most consistently when a radiant oven or air oven is used, slightly less consistently when a salt puffing apparatus is used, and somewhat less consistently yet when deep frying is used. It can be theorized that the agitation caused by the latter tends to interfere with the forces within the wafers which cause this cupping. However, it is recognized that deep fat frying has certain other advantages (e.g., a somewhat different flavor and texture of the end product) that may make its use more desirable, in spite of the fact that there may be a greater percentage of pieces which depart from the desired cup-like shape. Also in producing a commercial product, it may well be desirable to incorporate certain processing features which may be desirable in some respects (e.g., economy of operation, better quality control, somewhat better flavor or texture of the product, etc.), and sacrifice the rather high consistency of cupping which can be attained if the operating conditions are aimed primarily at imparting the cup shape to the pieces.

As a matter of interest, it is noted that at the completion of the intense heating, the diameter of the perimeter of the cup-shaped snack piece (this diameter dimension being indicated at $c$ in FIG. 3A) is only moderately greater (i.e., about 25% to 50% greater) than the diameter (indicated at $b$ of FIG. 2A) of the wafer before the final intense heating. In other respects, the overall dimensions of the piece approximately double during the intense heating.

As indicated previously, the relationship between the thickness (indicated at $a$ in FIG. 2A) and the diameter (indicated at $b$ in FIG. 2A) of the wafers before the puffing is critical, and should be between about one to thirty and four to thirty. Since in a snack piece there are obviously practical limits to the width and thickness dimensions (i.e., from a standpoint of consumer acceptability and also for permitting the various steps of the process to be carried out properly), the discussion herein will be directed to dimensions within this range. The thickness dimension should not be more than about .075 inch and for best results should be not more than about .065 inch, since the piece (especially the center portion) will not puff uniformly during the intense heating if the piece is too thick. Also with a large thickness and a relatively small diameter, the cupping of the wafers is inhibited, and the end product tends to be more flat. (For example with a one-half inch diameter and a thickness of .070, the pieces which are the end product do not cup to the desired extent.)

On the other hand, with the thickness too small, the wafers 10 tend to bend somewhat unpredictably during the puffing by intense heating, and the end product is somewhat fragile. The minimum thickness of the wafer 10 becomes more critical as the diameter of the wafer 10 is made larger. For example, with a diameter of one inch and a thickness of .035 inch, the shape of the end product tends somewhat to be more unpredictable, while with a diameter of one-half inch and a thickness of .035 inch, the cupping tends to be more uniform. Within a diameter range of one-half to one and a quarter inches the minimum thickness should be at least about .035 inch and for best results should be about .045 inch. (This one-half to one and a quarter inch range for the diameter appears to be the approximate practical range from the standpoint of consumer acceptability and practicality for a commercial operation.)

The present invention will be disclosed with more particularity in the following examples.

EXAMPLE I

The following ingredients were mixed to make a dough:

| | Percent |
|---|---|
| Corn flour | 53 |
| Oat flour | 7 |
| Sugar | 4.5 |
| Starch | 3.5 |
| Salt | 2 |
| Water | 30 |

A thoroughly gelatinized dough was formed by cooking these ingredients in a continuous paddle type steam jacketed cooker for a period of about one hour and at a dough temperature of about 210° F.

The gelatinized dough was fed by means of an auger-like extruder (the 6-inch screw model produced by Ambretti Co.) through a die having a center hole and six peripheral holes. The dough filaments emerging from the die were pressed together to form a rope. The diameter of this rope was about three-quarters inch. This rope was permitted to stand for a period of about one hour in an atmosphere at room temperature (i.e., about 70°) and a humidity of about 50%. This rope was then cut transversely to form wafers about .055 inch thick. The wafers were spread out and allowed to air dry for about 16 hours to a moisture of 9%. These wafers were placed in an air oven of a type produced by Proctor and Schwartz Co. and cooked for a period of about 33 seconds, with the air being at a temperature of 500° F., and the velocity of air passing through the particles being about 350 feet per minute.

The resultant product was a high quality puffed snack product, most all of the pieces of which had a cup-shaped configuration such as that shown in FIGS. 3A, 3B and 3C of the accompanying drawing.

EXAMPLE II

The same procedure was followed as in Example I, except that the thickness of the wafers cut from the dough rope was about .045 inch. Most all the pieces of the end product were cup shaped.

EXAMPLE III

The same procedure was followed as in Example I, except the thickness of the wafers cut from the dough rope was about .065 inch. Again most all the pieces were cup shaped.

EXAMPLE IV

The same procedure was followed as in Example I, except that the wafers were placed in a radiant oven of a type produced by Fostoria Co., and were heated for 25 seconds at about 425° F. Most all the pieces were cup shaped.

EXAMPLE V

The same procedure was followed as in Example I, except that the wafers cut from the dough rope were placed in a rotating barrel containing salt particles at a temperature of 420° F. for a period of about 22 seconds. Most all of the pieces were cup shaped.

EXAMPLE VI

The same procedure was followed as in Example I, except that the wafers were placed in an oil bath of about 395° F. for a period of about 18 seconds. Most of the pieces were cup shaped.

For purposes of comparison the same process was followed as in Example I, except that the diameter of the wafers was one inch and the thickness was .035 inch. Although there was a high degree of curl in the end product, the cupping was not too regular. Also wafers of one-half inch diameter were formed, and thicknesses of .065 inch and .075 inch were cut. These did not exhibit a great degree of cupping, but thicknesses of .035 inch did cup rather uniformly to the desired extent.

It should be understood that the foregoing is merely illustrative of a certain embodiment of the invention and many variations may be made by those skilled in the art without departing from the spirit and scope of the invention.

We claim:

1. In a process for making food pieces by urging a plurality of filaments of cooked dough together thereby forming a coalesced column having a predetermined diameter, a center filament portion and a plurality of outer filament portions which completely surround said center filament portion, cutting said column transversely to form a plurality of wafers, drying said wafers, and puffing said wafers by subjecting them to heating action, the improvement which comprises cutting said column into wafers having a thickness to diameter ratio ranging between about 1 to 30 and 4 to 30, and subjecting the wafers to intense heating for a period of time sufficient to puff said wafer and thereby cause them to assume a concave shape.

2. The process as recited in claim 1 wherein the thickness of said wafers before the intense heating ranges between about .035 and .075 inch.

3. The process as recited in claim 2 wherein said diameter of said wafers is at least about ½ inch.

4. The process as recited in claim 1 wherein the thickness of said wafers before intense heating is between about .045 and .065 inch, and the diameter of said wafers ranges from about ½ to 1¼ inches.

5. A product formed by the process of claim 1.

References Cited

UNITED STATES PATENTS

| | | | |
|---|---|---|---|
| 2,858,217 | 10/1958 | Benson | 99—80 |
| 2,858,218 | 10/1958 | Benson | 99—81 |
| 2,858,219 | 10/1958 | Benson | 99—83 |

RAYMOND N. JONES, *Primary Examiner.*

U.S. Cl. X.R.

99—83